March 11, 1969 PEI-TAI PAN 3,432,420

ELECTROLYTIC CELL ASSEMBLIES

Filed Jan. 13, 1965 Sheet 1 of 4

INVENTOR.
PEI-TAI PAN
BY Petherbridge,
O'Neill & Aubel Attys.

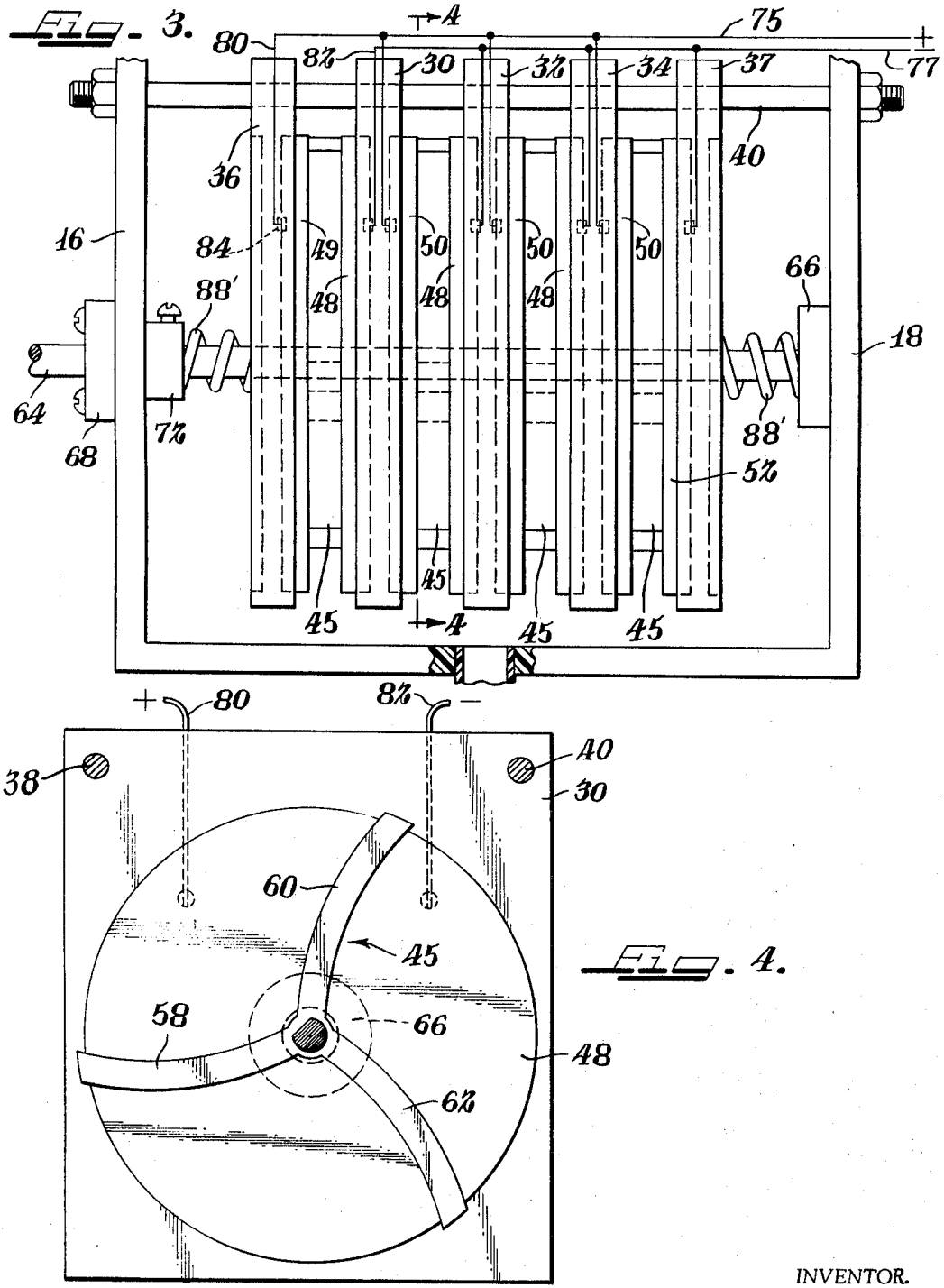

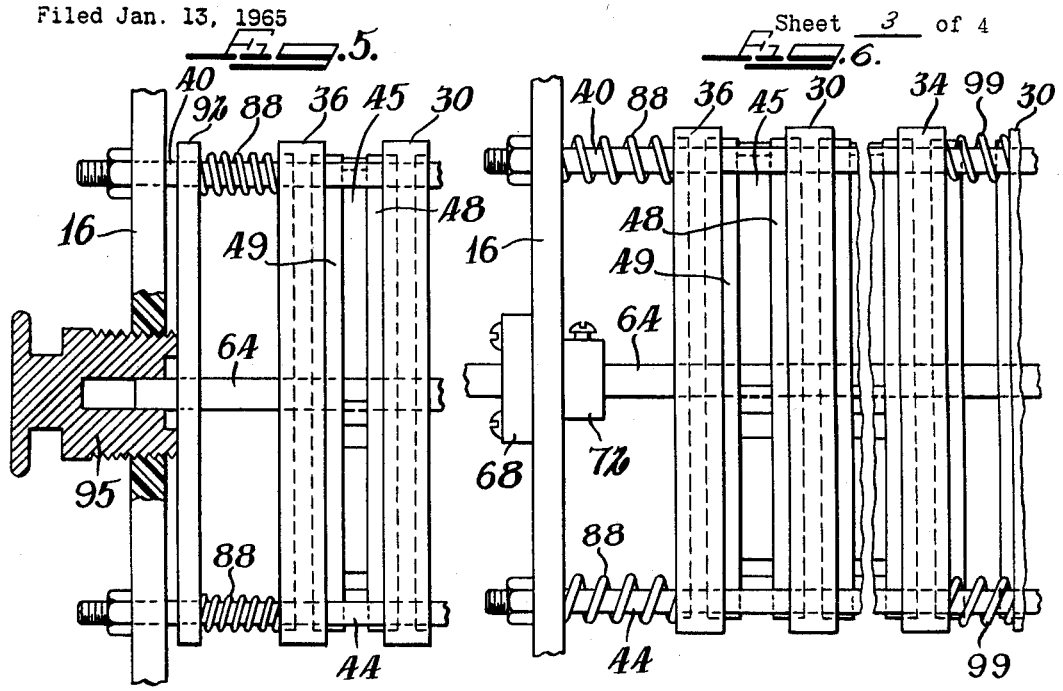
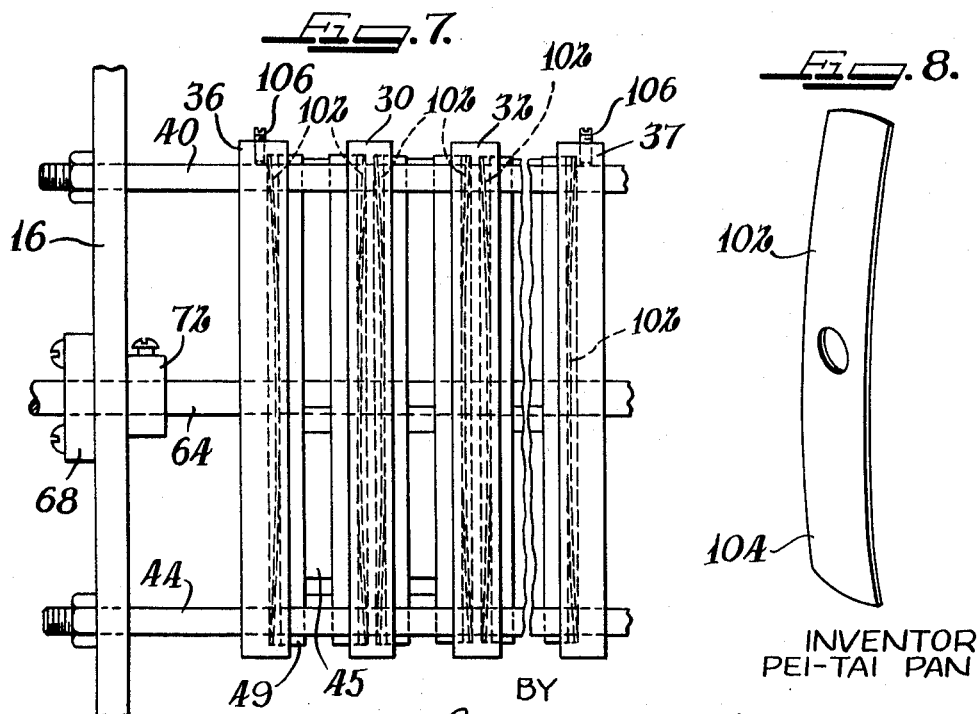

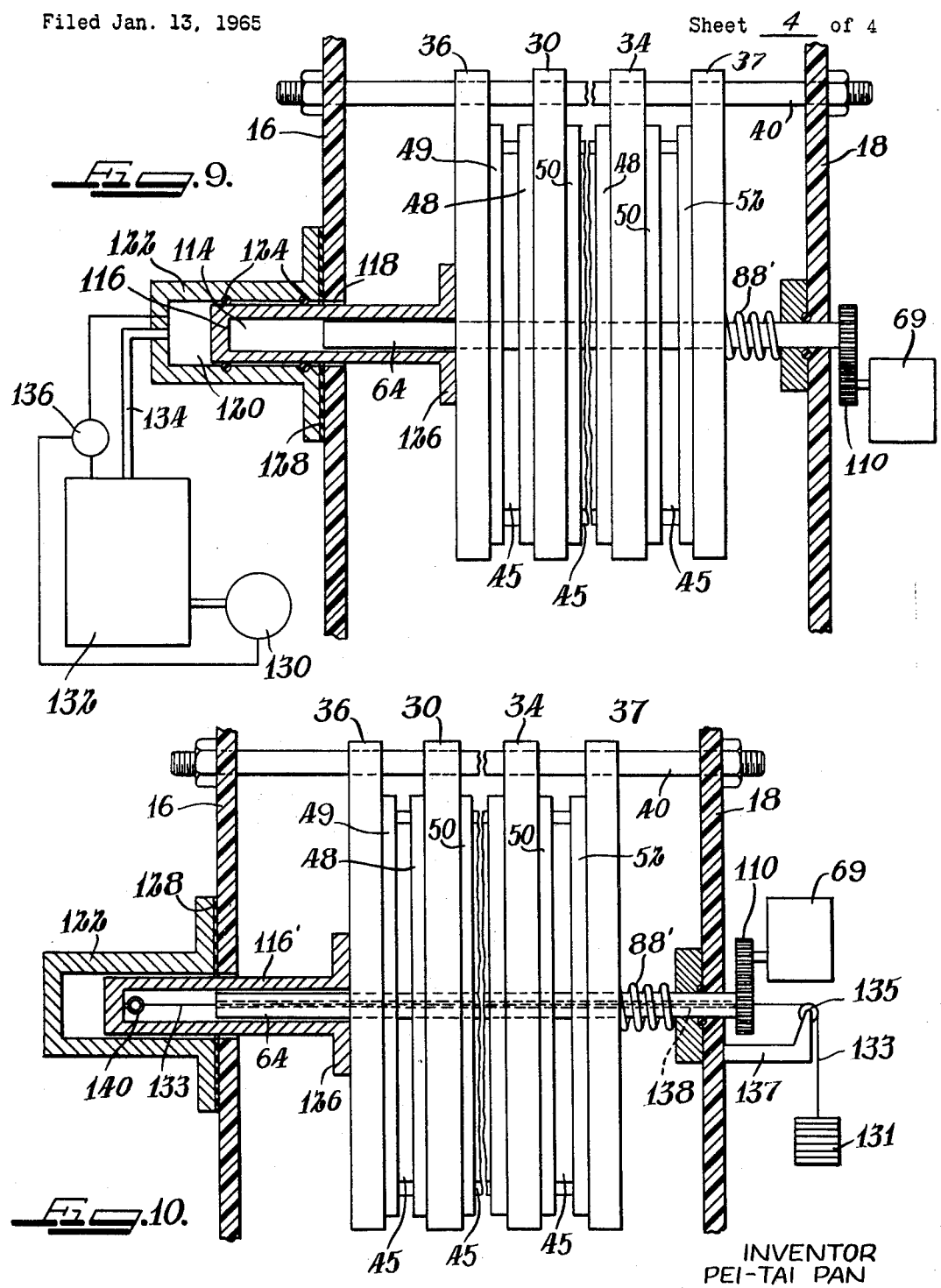

United States Patent Office 3,432,420
Patented Mar. 11, 1969

3,432,420
ELECTROLYTIC CELL ASSEMBLIES
Pei-Tai Pan, Beloit, Wis., assignor to Fairbanks Morse Inc., New York, N.Y., a corporation of Delaware
Filed Jan. 13, 1965, Ser. No. 425,252
U.S. Cl. 204—216                  26 Claims
Int. Cl. B23p 1/20; B01k 3/20

ABSTRACT OF THE DISCLOSURE

An electrolytic cell assembly in which the electrodes are movable, rotary scraper means are disposed between the electrodes and means are provided for biasing the electrodes against the scraper means.

---

This invention relates to new and improved electrolytic cell apparatus for separating impurities in dispersion from fluids and is more particularly directed to new and improved electrolytic cell apparatus for producing metal hydroxides for purification of liquids and the like.

Heretofore, difficulty has been encountered in the design and construction of efficiently operating electrolytic cells wherein the electrodes contribute to the formation of metal hydroxides. Efficiency in operation of such cells has been impaired during electrolysis by the presence of the metal ions generated by the electrodes for the purpose of forming hydroxides. Such electrolysis results in formation of a dielectric or electrical insulating film on the surfaces of the electrodes, an excess of metal hydroxides in suspension between the electrodes, and an increase in the distance between electrodes caused by loss of metal from the electrodes, all of which contribute to an increase in the electrical resistance of such cells of present design, and thus, to an attendant increase in the power requirements of the cell during normal use life of the cell.

Prior art attempts to remedy this efficiency loss problem have been directed to removing the film from the electrode surfaces by scrapers or wipers which contact the surface of the electrodes. In one embodiment of such a scraper or wiper approach to the solution of this problem, expansible scrapers or wipers have been proposed to compensate for the increase in the distance between electrodes. However, even with this embodiment, neither the problem of efficiency loss attributable to the increase in electrical resistance due to an increase in the spacing between the electrodes nor the problem of efficiency loss attributable to the presence of an excess of metal hydroxides and precipitated impurities in the water in suspension between the electrodes is solved.

With the present invention, the aforementioned problems and difficulties of the prior art are substantially overcome by the provision of an electrolytic cell apparatus including means for maintaining a fixed spacial distance between electrodes. In addition, the present invention provides wipers or scrapers which are so shaped as to minimize the quantity of metal hydroxides in suspension between electrodes.

It is, therefore, an object of the present invention to provide new and improved electrolytic cell assemblies.

Another object of the present invention is to provide new and improved electrolytic cell assemblies including electrodes generating metal hydroxides to clarify liquids and the like.

Still another object of the present invention is to provide an electrolytic cell assembly including means for maintaining substantially constant spacing between electrodes during the normal use life of the electrolytic cell assembly.

A further object of the present invention is to provide new and improved electrolytic cell assemblies having substantially constant electrical resistance between electrodes for treatment of impure liquids by producing metal hydroxides.

A still further object of the present invention is to provide new and improved electrolytic cell assemblies for producing metal hydroxides including new and improved means for contacting and cleaning the surface of the electrodes of said assembly and for efficiently removing metal hydroxides from the space between electrodes.

Another object of the present invention is to provide new and improved electrolytic cell assemblies having movable electrodes for maintaining a constant space between the electrodes.

A still further object of the present invention is to provide new and improved electrolytic cell scraper or wiping devices for maintaining the electrodes substantially film free and for removing metal hydroxides in suspension from between the electrodes.

Another object of the present invention is to provide an electrolytic cell assembly simple and compact in construction and efficient in operation.

These and other objects, features and advantages of the present invention will become readily apparent from a careful consideration of the following detailed description, when considered in conjunction with the accompanying drawings illustrating preferred embodiments of the present invention, and wherein:

FIGURE 3 is a fragmentary view in elevation of a modification of the assembly of FIGURE 1;

FIGURE 4 is a view taken along line 4—4 of FIGURE 3;

FIGURE 5 is a fragmentary view in side elevation of another modification of the present invention;

FIGURE 6 is a fragmentary view of still another embodiment of the present invention partially broken to facilitate illustration;

FIGURE 7 is a fragmentary view in side elevation of another embodiment of the present invention partially broken to facilitate illustration;

FIGURE 8 is a perspective view of spring means employed in the embodiment of FIGURE 7;

FIGURE 9 is a fragmentary view in side elevation of still another embodiment of the present invention including means for automatically controlling tension on the electrodes in a cell assembly;

FIGURE 10 is a fragmentary view of one form of means for varying tension on the electrodes of a cell assembly;

Figure 1:
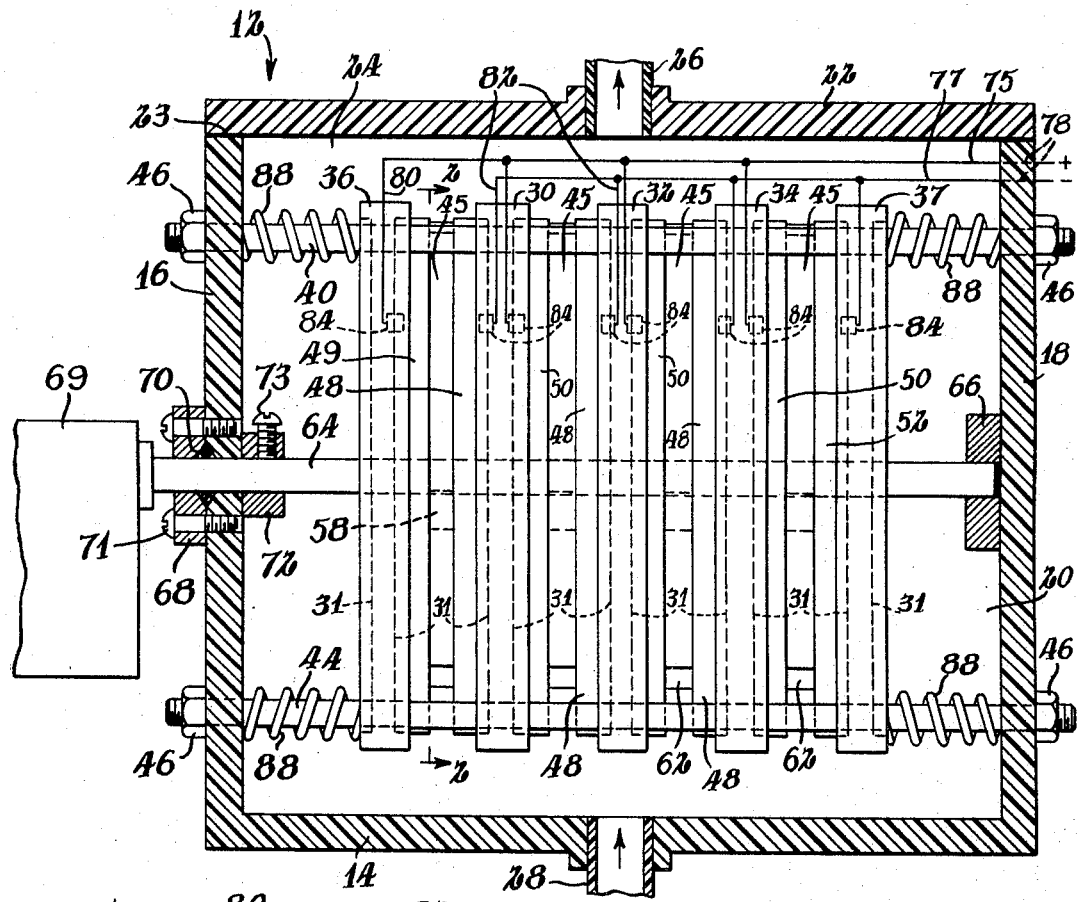
FIGURE 1 is a side view in partial vertical section of an electrolytic cell assembly constructed in accordance with the principles of the present invention.

Referring now to the drawings and particularly to FIGURE 1 there is disclosed a preferred embodiment of an electrolytic cell assembly constructed in accordance with the present invention.

The electrolytic cell assembly of FIGURE 1 includes a housing, generally designated by the numeral 12, having a base 14 which has four side walls 16, 18 and 20, one side wall corresponding to side wall 20 not being shown. The housing 12 also includes a top wall 22 which is removable and secured to the four side walls by means (not shown) and sealed by a rectangular seal ring 23 to complete the housing assembly.

The walls define a chamber 24 into which the fluid to be clarified is introduced through an inlet 28 located in the bottom wall 14. The upper wall 22 is provided with a fluid outlet 26. The housing and inlet and outlet are preferably constructed of a corrosion resistant material, such as plastic.

Figure 2:
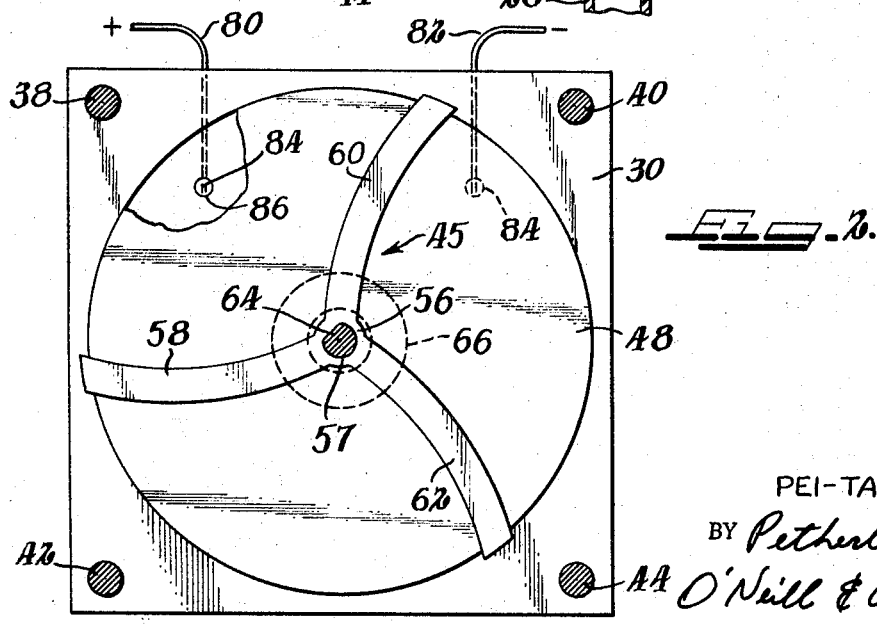
FIGURE 2 is a view taken along line 2—2 of FIGURE 1 and illustrating the arrangement of electrode holders and electrodes and partially broken away to illustrate a mounting feature of the present invention.

Referring to FIGURES 1 and 2, there is shown electrode holding and insulating plates comprising intermediate insulating plates 30, 32 and 34 and end insulating plates 36 and 37.

Each of these intermediate plates 30, 32 and 34 and end plates 36 and 37 are constructed of dielectric material and, as indicated in FIGURE 2, each is provided with four spaced apertures, the apertures being located in the four corners of each plate for receiving one of a plurality of tie rods and a central aperture. The tie rods 38, 40, 42 and 44 pass through the four spaced apertures in the end and intermediate insulating plates and through apertures formed in the opposite side walls 16 and 18. The tie rods are secured to the side walls 16 and 18 by nuts, such as nuts 46 (FIGURE 1).

The rectangular intermediate electrode holding and insulating plates 30, 32 and 34 are each provided with a pair of oppositely facing medial circular electrode receiving recesses 31. Each of the end electrode holding and insulating plates 36 and 37 may be provided with a single circular and medially located recess 31 for receiving an electrode plate or, as shown in FIGURE 1, both sides of the end plates 36 and 37 may be provided with such a recess 31, as indicated by dotted lines in FIGURE 1.

The recesses 31 formed in the intermediate electrode holding plates and in the end electrode holding plates are of a depth sufficient to permit the electrodes to extend beyond the adjacent surface of the electrode holding plate in the electrode and insulating plate stack assembly carried by the tie rods 38, 40, 42 and 44.

As appears in side view in FIGURE 1 and in front elevation in FIGURE 2, a plurality of circular metal hydroxide generating electrodes having a central aperture are provided. The plurality of electrodes include intermediate electrodes 48 of negative polarity, intermediate electrodes 50 of positive polarity, end electrode 49 of positive polarity and end electrode 52 of negative polarity. The electrodes are shown in FIGURE 1 disposed in the recesses of the electrode plates with electrodes of opposite polarity facing each other.

Disposed between each of the electrodes is a vertically extending scraper or wiper device 45. Each of the scrapers 45, as shown in FIGURE 2, includes a hub 56 carrying a plurality of radially arcuate arms 58, 60 and 62. The arms 58, 60 and 62 are of a radius greater than the radius of the electrodes for purposes more fully described hereinafter.

Each of the scrapers or wipers 45 is provided with a key slot 57 for receiving a shaft 64 which passes freely through apertures formed in the insulating plates and in the electrode plates. The shaft 64 is constructed of dielectric material and is journalled at one end in a bearing 66 carried by the side wall 18 of the housing 12 and extends through an aperture formed in the opposite side wall 16 of the housing to a drive motor 69. An O ring seal 70 is seated in grooves formed in the end wall 16 of the housing and in a seal ring 68 secured as by screws 71 to the wall 16. A clamp ring 72 is secured as by a screw 73 to the shaft 64 for preventing reciprocal movement of the shaft 64.

Electrical connection of the electrodes to a source of D.C. energy exterior of the housing 12 is provided in the conventional manner by a positive buss 75 and negative buss 77 which passed through a sealed aperature 78 formed in the end wall 18. Positive leads 80 from the buss 75 pass through drilled and sealed apertures formed in the intermediate plates 30, 32 and 34 and end plate 36. Negative leads 82 from the buss 77 pass through the intermediate insulating plates 30, 32 and 34 and end plate 37. Each lead terminates in a locator, electrical contact pin (FIGURE 2) indicated by the numeral 84 which is a metal contact pin buried or otherwise carried by the intermediate and end insulating plates with a portion thereof extending into the recess of the insulating plates. It will be observed from FIGURE 1 that the end plates 36 and 37 each have only one of these locator contact pins 84, whereas the intermediate plates 30, 32 and 34 each have two locator contact plins 84, as indicated by dotted lines, one of said pins extending into each recess formed in each plate 30, 32 and 34. The locator pins 84 carried by the insulating plates seat in holes 86 (FIGURE 2) formed in the electrodes 48 to complete the electrical contact with the electrodes. Each of the locator pins 84 and holes 86 provide means for seating the electrodes during assembly of the electrolytic cell, as well as providing an electrical contact for the electrodes.

In one method of assembly of the electrode holding and insulating plates, electrodes, and scrapers stack, the end electrode holding and insulating plate 36 is freely slid on the shaft 64 by passing the shaft 64 through the central aperture of the plate 36. The end plate 36 is freely slid onto the shaft 64 with one or the other of the electrode-receiving recesses 31 facing to the right as viewed in FIGURE 1. An end electrode 49 is then freely slid on the shaft by passing the shaft 64 through the central aperture in the electrode, and the electrode is slipped into the recess of the plate 36. The locator pin 84 on the plate 36 is seated in the aperture 86 of the electrode 49 to thereby properly locate the electrode 49 in the recess 31 of the plate 36. From the plurality of devices 45 all having arms 58, 60, and 62 preferably constructed of hard rubber, a scraper or wiper device 45 is next selected and keyed to the shaft 64 and slid on to the shaft. The next electrode 48 is then freely slid on to the shaft 64 and the first intermediate insulating plate 30 then freely slid on the shaft 64 by passing the shaft through the central aperture of the plate 30. The locator pin 84 in the recess formed in the left-hand side of the insulating plate 30, as viewed in FIGURE 1, is then located in the aperture 86 of the first intermediate electrode 48, on the left-hand side as viewed in FIGURE 1. Another centrally apertured electrode 50 is then freely slid on to the shaft 64 and the second locator pin 84 in the other recess of the insulating plate 30 seated in the aperture of that electrode 50. Next, a second scraper or wiper device 45 is keyed to the shaft 64, an electrode 48 is then freely slid on the shaft 64, the second intermediate plate 32 is slid on to the shaft 64, and another electrode 50 is slid on the shaft 64, the locator pins of the insulating plates seated in the corresponding apertures of the electrodes, and so on until the end plate 37 is slid on the shaft 64.

Next, the tie rods 38, 40, 42 and 44 are passed through the corresponding apertures in the end and intermediate insulating plates of the electrode stack.

To maintain the stack of insulating plates, electrodes and scraper or wiper devices in assembled relation, springs 88 next are slid on the tie rods 38, 40, 42 and 44 to circumscribe these tie rods at each end adjacent the walls 16 and 18. The springs 88 adjacent wall 16 are bottomed against the wall 16 at one end and against the end plate 36, whereas the springs 88 adjacent the end wall 18 are bottomed against the wall 18 at one end and against the end plate 37. The nuts 46 are then tightened to calibrate the insulating plate, electrode and scraper or wiper devices stack. These springs 88 continuously maintain a biasing force against the assembled stack of plates 36, 37, 30, 33, 34, electrode plates 48, 49, 50 and 52 and scraper or wiper devices 45 so that, during operation of the cell with a fluid to be clarified being introduced through the inlet 28 and clarified water containing metal hydroxide flock discharging through outlet 26, the hydroxide flock being generated electrolytically by energization of the electrodes through buss 75 and buss 77, the spacing between the electrodes of opposite polarity is maintained substantially constant even though electrolysis results in a loss of metal from the surfaces of the electrodes. It will be observed that the insulating plates 30, 32, 34, 36 and 37 are reversible and also may be used interchangeably to provide thereby a versatile arrangement. The springs 88 maintain the insulating plates, and thus the electrodes, in contact with the scraper or wiper devices 45 to assure that the film forming substance on the electrode surfaces is removed. By providing a radius dimension to the blades of the scraper or wiper devices of greater dimension than the radius of the electrodes and by curving the blades, the flock in liquid suspension in the space between facing electrodes of opposite polarity is readily removed since the direction of flow of the hydroxide flock dispersion between blades is outwardly towards the tips of the blades during rotation of the scraper or wiper devices 45 by the shaft 64.

Thus, the arrangement of the present invention of insulating plates, electrodes, scrapers and spring means for continuously urging the electrodes against the scraper or wiper devices provides important features of the present invention in minimizing the prior art problems of the deleterious effects on operation caused by an increase in the spacing between electrodes attributable to electrode metal loss, an excess of metal hydroxide flock in the space between electrodes and of the film forming on the electrode facing surfaces.

In the emodiment of the present invention appearing in FIGURES 3 and 4, spring means 88' are shown circumscribing the scraper or wiper shaft 64 at opposite ends of the plate, electrode and scraper or wiper device stack. These springs 88' are bottomed against the end plates 36 and 37 at one end, respectively, and against the bearing 66 and collar 72 at the other end, respectively. In this embodiment of the present invention two hanger type tie rods 38 and 40, rather than the four tie rods of the embodiment of FIGURE 1, are employed. The assembly appearing in FIGURES 3 and 4 is the same in construction and operation as the embodiment of FIGURE 1 except for the employment of two hanger type tie rods rather than four.

In FIGURE 5 is disclosed another embodiment of the present invention wherein the springs 88 are bottomed at one end against an insulated plate 92 and bottomed at their opposite ends against the end plate 36. A centrally located adjusting screw 95 is threaded into the side wall 16 to bear against the plate 92 for urging the plate 92 against springs 88 and to the right, as viewed in FIGURE 5. This adjusting screw and plate 92 are centrally apertured to permit free passage of the end of the drive shaft 64 and for providing means for adjusting the tension on the springs 88 in the event it becomes necessary to adjust such tension or to calibrate the springs prior to use thereof in the electrolytic cell assembly. In this embodiment, the motor 69 (FIG. 1) is located adjacent the side wall 18 (not shown).

In the embodiment of the present invention appearing in FIGURE 6, a plurality of springs 88 are employed in conjunction with the four tie rods of the embodiment of FIGURE 1. Springs 88 are shown bottomed at one end against end plate 16 and at their other end against holder plate 36. In addition to springs 88, other springs 99 are employed to coact wtih springs 88 when the cell assembly includes a large number of electrodes, electrode insulating plates and wiper devices. In this case, use of only the springs 88, if only springs 88 bearing against the side plates 16 and 18 at each end of the stack were employed, whould be prohibitive costwise is that the tension producing requirements of the springs would require large size springs. To avoid this problem, springs 99 of small or comparable size to the springs 88 may be employed intermittently at predetermined locations in the stack, as illustrated in FIGURE 6. Springs 99 are disposed in cumscribing relation to the tie rods and are each bottomed at both ends against selected electrode holding and insulating plates, such as plates 30 and 34. The springs 88 and springs 99 coact to maintain a predetermined spacing between the facing electrodes of opposite polarity and thus a predetermined spacing of the electrodes in the electrode stack assembly.

In FIGURE 7, another embodiment of the present invention is disclosed wherein springs 88 are not employed. In this embodiment, the end holder plates 36 and 37 are fixed to the tie rods 38 and 40 by set screws 106. In this embodiment, springs, such as Marcel springs 102 (FIGURE 8), are apertured as indicated at 104 for mounting on the shaft 64. These springs 192 are sized to seat against the vertical rear recess defining wall in the electrode holding insulating plates for bearing thereof against the rear surface or left-hand surfaces, as viewed in FIGURE 7, of each electrode. One of such springs 102 is seated in the recess of each of the electrode holding, insulating plates to continuously urge the electrode plates against the corresponding scraper or wiper devices 45. Each spring 102 is preferably of a length to engage the opposite top and bottom ends of the recess defining portion of the insulating plates to prevent movement thereof and to provide means for maintaining a biasing tension against the adjacent electrode. Thus, in this embodiment, the electrodes of the fixed end holder plates 36 and 37 and the electrodes of the intermediate plates 30, 32 and 34 are maintained in biased relation to the wiper devices 45. The plates 36 and 37 are stationary.

In operation, the fluid to be clarified is introduced into the chamber 24 (FIGURE 1) through the inlet 28 and flows between the electrodes 48, 49, 50 and 52. During electrolysis, metal hydroxides are formed by loss of metal from the surfaces of the electrodes. This metal hydroxide forms a flock which is employed to remove particulate material from the liquid to be clarified. Loss of such metal from the electrodes causes the spacing between facing electrodes of opposite polarity to increase; however, the springs 88, 88', 99 and 102, depending upon the embodiment of the present invention employed, continuously bias the facing electrodes towards each other and against the scraper or wiper devices 45 so that the distance between facing electrodes of opposite polarity remains substantially constant. The scraper or wiper devices 45, because of their curved blade construction and also because of their length, rapidly remove the suspended hydroxide flock from the spaces between facing electrodes. Further, because of maintenance of substantially constant spacing between the facing electrodes by the various spring arrangements shown in the different embodiments of the present invention illustrated, the electrical resistance between the facing electrodes of opposite polarity remains substantially constant and, therefore, the use life of the electrolytic cell apparatus of the present invention is prolonged. In addition, the scraper or wiper devices 45 may be rotated during electrolysis and, in contacting the surface of the adjacent facing electrodes, remove the film forming substance from the surfaces of these electrodes thereby enhancing electrolysis.

It will, therefore, be appreciated that the present invention provides new and improved electrolytic cell apparatus whereby the spacing between facing electrodes of opposite polarity may be maintained substantially constant with attendant features of removing film forming substances from the facing electrodes and rapid removal of hydroxide materials in suspension from between facing electrodes of opposite polarity.

FIGURES 9 and 10 both disclose pressure control systems for automatically maintaining a substantially constant pressure on the stack of holders, electrodes and wipers so that the electrodes are maintained in contact with the wiper devices during the use life of the cell assembly.

In both FIGURES 9 and 10, hanger type tie rods 38 (not shown) and 40 of FIGURE 3 carry electrode holder plates 36, 30, etc. and 37. Electrodes 48, 49, 50 and 52 are urged by a spring 88' against the scraper or wiper devices 45 carried by the shaft 64. Shaft 64 carries externally of the side wall 18 reduction gearing 110 driven by the motor 69. The left-hand end of the shaft of the embodiment of FIGURE 9 extends into a slide chamber 114 of a piston 116 which extends through an aperture 118 formed in the side wall 16 into the driving fluid chamber 120 of a housing 122 secured by means (not shown) to the side wall 16. Seal means 124 prevent fluid leak between the internal wall of the housing 122 defining the chamber 120 and the piston 116.

The piston 116 is provided with an annular external flange 126 which is adapted to bear on the end plate 36. A seal 128 is employed to aid in providing a leak-proof chamber 120.

A compressor 130 supplies pressurized fluid, such as air in the embodiment illustrated in FIGURE 9, or water, to a pressure tank 132 which in turn supply the pressurized fluid through a conduit 134 to the chamber 120. The pressure level of the fluid in chamber 120 is controlled and maintained at a desired value by a pressure swich 136.

In operation, the pressure in chamber 120 action on the piston 116 is pre-set to maintain a substantially constant pressure on the stack of movable electrode holders, movable electrodes and wipers against the bias of the spring 88' and to assure contact of the electrodes 48, 49, 50 and 52 with the wiper devices 45. When the electrodes corrode during electrolysis and cause an increase in the spacing between electrodes, the pressure of the fluid in the chamber 120 then causes the piston 116 to move to the right, as viewed in FIGURE 9, and such movement of the piston causes a decrease in the pressure in the chamber 120. The switch 136 senses the drop in pressure in the chamber 120 and, in response to such pressure drop, actuates the compressor 130 to increase the pressure in the tank 132, in conduit 134 and thus in the chamber 120 thereby returning the pressure level in the chamber 120 to the desired level at which time the switch 136 is de-activated to terminate operation of the compressor 130. The above cycle of operation of the pressure control system occurs continuously through electrolytic operation of the cell assembly to maintain a substantially constant pressure on the stack of holders, electrodes and wipers.

In FIGURE 10 there is disclosed a pressure control system employing a mechanical counter weight to automatically maintain a substantially constant pressure on the stack of holders, electrodes and wipers so that the electrodes are maintained in contact with the wipers.

In the arrangement of FIGURE 10, the housing 122 is a guide housing for a plunger 116' which is of construction similar to the construction of piston 116 of FIGURE 9. The housing 116' is caused to bear against the movable holder plate 36 by means of a weight assemply compressing a weight 131 hanging in free suspension from a line 133 which passes over a pulley wheel 135 carried by a bracket 137 mounted to the side well 18 of the cell assembly.

The line 133 passes through an axial bore 138 which is shown in dotted lines in FIGURE 10 and which is formed in the shaft 64. The line 133 extends beyond the left-hand end, as viewed in FIGURE 10, of the shaft 64 and is secured to the housing 116' as by connection to a ring 140 mounted to the housing 116'. The weight 131 acting on the line 133 continuously urges the housing 116' against the holder 36 and thus against the bias of the spring 88' to maintain a substantially constant pressure on the stack of holders, electrodes and wipers.

In operation, a weight or weights 131 are suspended from the line 133 to apply a desired pressure to the stack of movable holders, movable electrodes and wipers. When the electrodes corrode during electrolysis and the spacing between electrodes tends to increase, the weight 131 continuously maintains the housing 116' in contact with the movable holder 36 to apply a desired pressure on the stack of holders, electrodes and wipers.

Although minor modifications and alternations of the present invention will become readily apparent to those versed in the art, it should be understood that what is intended to be encompassed within the scope of the patent warranted hereon are all such embodiments as reasonably and properly come within the scope of the contribution to the art hereby made.

I claim:

1. An electrolytic cell assembly comprising a housing defining a chamber and having an inlet and an outlet for passage of an electrolytic fluid to be treated through the chamber, at least one cathode electrical conductor and at least one anode electrical conductor, at least one of said conductors being movably disposed in said chamber, means for electrically insulating said conductors, rotary scraper means disposed at least partially between said conductors for spacing said conductors, contact means electrically connected to said conductors and adapted for connection to means for energizing said conductors, and means for continuously applying a biasing force against said movable conductor to urge said movable conductor towards an adjacent conductor and against said scraper means.

2. The assembly of claim 1 wherein said biasing means is resilient means.

3. The assembly of claim 1 wherein said biasing means is spring means.

4. The assembly of claim 3 wherein said spring means is a plurality of spaced compression springs each in contact at one end with the housing and in contact at the other end with said insulating means.

5. An electrolytic cell assembly comprising a housing defining a chamber and having an inlet and an outlet for passage of an electrolytic fluid to be treated through the chamber, at least one cathode electrode and at least one anode electrode, both electrodes being movably disposed in the chamber, means for electrically insulating said electrodes, rotary means movable about a horizontal axis disposed at least partially between the electrodes for contact with at least one of the adjacent surfaces of said electrodes and for spacing said electrodes, contact means electrically connected to said electrodes and adapted for connection to means for energizing said electrodes, means for moving said movable means to clean the surface of said contacted electrode, and means for continuously urging said electrodes towards each other and in contact with said rotary means.

6. The assembly of claim 5 wherein said rotary means contacts adjacent electrodes and said urging means continuously urges said electrodes against said movable means to maintain substantially the same spacing between electrodes.

7. The assembly of claim 6 wherein said electrodes are plate electrodes.

8. The assembly of claim 1 wherein said scraper means comprises a hub and at least one curved arm radiating from the hub.

9. The assembly of claim 1 wherein said scraper means comprises a hub and a plurality of curved arms radiating from the hub.

10. An electrolytic cell assembly comprising a housing defining a chamber and having opposite side walls and an inlet and an outlet for passage of an electrolytic fluid to be treated through the chamber, at least one cathode electrode in the chamber, at least one anode electrode in the chamber, insulating means movably mounting the electrodes in the chamber, at least one horizontally disposed tie rod carried by the said opposite walls of the housing and supporting said insultating means in the chamber, rotary scraper means between said electrodes for spacing the electrodes, and means biasing at least one of said electrodes against said scraper means to maintain a constant spacing between said electrodes during the use life of the assembly.

11. The assembly of claim 10 wherein said biasing means are resilient means acting against said housing and said insulating means to urge said electrode against said scraper means.

12. The assembly of claim 11 wherein said insulating means comprise a pair of recessed plates, said electrodes are plates, an electrode plate being disposed in the recess of each of said insulating plates and said tie rod passes through apertures in said insulating plates, and including a shaft carrying said spacer means for rotation thereof, said shaft passing through an aperture formed in at least one of said insulating plates and an aperture formed in at least the corresponding electrode and carried for rotation in at least one of said housing side walls.

13. The assembly of claim 12 wherein said biasing means is a compression spring carried by said tie rod, bottomed at one end against said housing and at its other end against one of said insulating plates.

14. The assembly of claim 13 wherein said spacing means is a scraper or wiper including a hub mounted for rotation to said shaft and a plurality of blades radiating therefrom in contact with said electrodes to maintain the spacing between said electrodes.

15. The assembly of claim 14 wherein said blades are curved.

16. An electrolytic cell including a housing defining a chamber having an inlet and an outlet for an electrolytic fluid to be treated in the chamber and having a pair of opposite side walls, a plurality of tie rods horizontally disposed between and carried by said side walls, a pair of end insulating plates and a plurality of intermediate insulating plates vertically carried by said tie rods in the housing, each of the end plates having a vertical facing surface recess and each of the intermediate plates having a vertical recess in each side surface thereof, anode and cathode electrodes alternately disposed in said recesses, a shaft carried for rotation between said opposite side walls of the housing and horizontally extending through said insulating plates and said electrode plates, a cleaning device carried by said shaft between each pair of adjacent anode and cathode electrodes for contact with and cleaning of the adjacent surfaces of the contacted electrodes and for maintaining the spacing of said electrodes, said cleaning devices each comprising a hub and a plurality of curved blades radially from the hub in contact with the adjacent electrode facing surfaces, and a compression spring carried around each of said tie rods and bottomed at one end against one of said side walls of said housing and the adjacent end insulating plate to continuously urge said electrodes against said cleaning devices during the normal use life of the assembly.

17. The assembly of claim 1 including a shaft in the chamber for rotating said movable means and wherein said urging means is spring means carried around said shaft and bottomed against said housing and against said insulating means.

18. The assembly of claim 1 including a movable end insulated end plate disposed between one of said side walls and said urging means and spaced from said side wall by means for controlling the biasing force of the said urging means, said control means being activatable to moved said insulated end plate towards said conductors.

19. The assembly of claim 18 wherein said control means is screw means located in said side wall of the housing adjacent the insulated end plate and bearing against said end plate.

20. The assembly of claim 16 including additional spring means carried by said tie rods between said insulating plates, each of said additional spring means bearing against adjacent insulating plates.

21. The assembly of claim 1 wherein said urging means includes resilient means located between said insulating means and said conductors.

22. An electrolytic cell assembly comprising a housing defining a chamber and having an inlet and outlet for passage of an electrolytic fluid to be treated through the chamber, electrical conductors in said chamber, at least one of said conductors being movable, means for electrically insulating said conductors, rotary scraper means partially disposed between said conductors for spacing said conductors, contact means electrically connected to said conductors and adapted for connection to means for electrically energizing said conductors, and pressure means for continuously applying a biasing pressure force against said movable conductor to urge said movable conductor towards an adjacent conductor and against said scraper means, said pressure means being responsive to movement of said movable conductor to maintain a substantially constant pressure force on said movable conductor.

23. The assembly of claim 22 wherein said pressure means comprises a piston acting on said movable conductor to urge said movable conductor towards said adjacent conductor and against said spacing means, a driving fluid chamber in which said piston is movably disposed, a source for supplying pressurized driving fluid to said driving fluid chamber to control the position of said piston in said driving fluid chamber, and a device responsive to a change in pressure in said driving fluid chamber for maintaining a predetermined pressure level in said driving fluid chamber to thereby maintain the piston in a predetermined position relative to said movable conductor.

24. The assembly of claim 23 wherein said device is a pressure switch device.

25. The assembly of claim 22 wherein said pressure means includes a weight mass acting on said movable conductor.

26. The assembly of claim 25 wherein said pressure means further includes a movable member bearing against said movable conductor, a line connecting said movable member and said weight mass, said weight mass hanging in free suspension and acting on said movable member to maintain a substantially constant pressure force on said movable member and said movable conductor.

References Cited

UNITED STATES PATENTS

| 1,115,513 | 11/1914 | Dennis | 204—96 |
|---|---|---|---|
| 2,667,454 | 1/1954 | Roller | 204—96 |
| 3,182,010 | 5/1965 | Roller | 204—227 |
| 3,006,826 | 10/1961 | Roller | 204—96 |
| 3,236,757 | 2/1966 | Litt | 204—149 |
| 3,256,162 | 6/1966 | Roller | 204—96 |
| 3,294,665 | 12/1966 | Roller | 204—227 |

JOHN H. MACK, *Primary Examiner.*

W. VAN SISE, *Assistant Examiner.*

U.S. Cl. X.R.

204—216, 227, 242, 98

UNITED STATES PATENT OFFICE
CERTIFICATE OF CORRECTION

Patent No. 3,432,420

March 11, 1969

Pei-Tai Pan

It is certified that error appears in the above identified patent and that said Letters Patent are hereby corrected as shown below:

Column 4, line 6, "plins" should read -- pins --. Column 5, line 25, "emodiment" should read -- embodiment --; line 65, "whould" should read -- would --. Column 6, line 9, "192" should read -- 102 --. Column 7, line 19, "action" should read -- acting --. Column 8, line 66, "insultating" should read -- insulating --. Column 9, line 58, "moved" should read -- move --.

Signed and sealed this 23rd day of February 1971.

(SEAL)
Attest:

Edward M. Fletcher, Jr.
Attesting Officer

WILLIAM E. SCHUYLER, JR.
Commissioner of Patents